(12) United States Patent
Rauber et al.

(10) Patent No.: US 11,305,643 B2
(45) Date of Patent: Apr. 19, 2022

(54) FUEL DELIVERY UNIT, FUEL DELIVERY SYSTEM AND VEHICLE

(71) Applicant: Vitesco Technologies GmbH, Hannover (DE)

(72) Inventors: Jens Rauber, Schwalbach a Ts. (DE); Marcus Koch, Schwalbach a Ts. (DE); Ingo Kotza, Schwalbach a Ts. (DE)

(73) Assignee: Vitesco Technologies GmbH, Hannover (DE)

(*) Notice: Subject to any disclaimer, the term of this patent is extended or adjusted under 35 U.S.C. 154(b) by 0 days.

(21) Appl. No.: 17/058,922

(22) PCT Filed: May 29, 2019

(86) PCT No.: PCT/EP2019/063987
§ 371 (c)(1),
(2) Date: Nov. 25, 2020

(87) PCT Pub. No.: WO2019/229135
PCT Pub. Date: Dec. 5, 2019

(65) Prior Publication Data
US 2021/0213826 A1    Jul. 15, 2021

(30) Foreign Application Priority Data
May 29, 2018   (DE) ...................... 10 2018 208 480.7

(51) Int. Cl.
*B60K 15/03*       (2006.01)
*B60R 16/02*       (2006.01)
(Continued)

(52) U.S. Cl.
CPC .......... *B60K 15/03* (2013.01); *B60R 16/0207* (2013.01); *F02M 37/0088* (2013.01);
(Continued)

(58) Field of Classification Search
CPC . B60R 16/0215; B60R 16/0207; B60R 16/03; H01B 7/0045; H02G 11/00;
(Continued)

(56) References Cited

U.S. PATENT DOCUMENTS 6,213,100 B1    4/2001  Johansen
2002/0033168 A1  3/2002  Noda
(Continued)

FOREIGN PATENT DOCUMENTS

CN           1475668     2/2004
CN        201011329 Y    1/2008
(Continued)

OTHER PUBLICATIONS

International Search Report issued in corresponding PCT Application PCT/EP2019/063987.
(Continued)

*Primary Examiner* — Atif H Chaudry
(74) *Attorney, Agent, or Firm* — Cozen O'Connor

(57) ABSTRACT

A fuel delivery unit for use within a vehicle fuel tank includes: a surge tank arranged on a wall of the fuel tank, a feed line extending from a region of the surge tank to a connector stub on the flange, and a wiring harness extending from the fuel pump to the flange. A flange-side holder forms a first force application point for fixing the wiring harness on a flange side, and a surge tank-side holder forms a second force application point for fixing the wiring harness on the surge tank side. The wiring harness, the flange-side holder and the surge tank-side holder together form a force absorber configured to protect the feed line and the connector stub during a vehicle impact by absorbing kinetic energy from the impact acting on the fuel delivery unit, thereby dissipating the kinetic energy.

12 Claims, 7 Drawing Sheets

(51) Int. Cl.
  *F02M 37/00* (2006.01)
  *F02M 37/08* (2006.01)
  *F16L 35/00* (2006.01)
(52) U.S. Cl.
  CPC ............. *F02M 37/08* (2013.01); *F16L 35/00* (2013.01); *B60K 2015/03118* (2013.01); *B60K 2015/03243* (2013.01)
(58) Field of Classification Search
  CPC .......... B60K 15/03; B60K 2015/03118; B60K 2015/03243; F02M 37/0088; F02M 37/08; F02M 37/0076; F02M 37/10; F02M 2200/185; F16L 35/00; Y10T 137/6881
  See application file for complete search history.

(56) References Cited

U.S. PATENT DOCUMENTS

| | | | |
|---|---|---|---|
| 2006/0219318 A1* | 10/2006 | Crary | F02M 37/106 141/286 |
| 2010/0178180 A1* | 7/2010 | Homma | F04B 17/03 417/422 |
| 2015/0059707 A1 | 3/2015 | Oohashi | |
| 2019/0047405 A1* | 2/2019 | Niwa | B60K 15/03504 |
| 2019/0178211 A1* | 6/2019 | Maruyama | F02M 37/04 |

FOREIGN PATENT DOCUMENTS

| | | |
|---|---|---|
| CN | 103375318 | 10/2013 |
| DE | 1021054 B | 12/1957 |
| DE | 10002613 A1 | 7/2001 |
| DE | 10 2005 017 519 | 10/2006 |
| DE | 102015213899 A1 | 1/2017 |
| FR | 2722147 | 1/1996 |
| WO | WO 2009/068694 | 6/2009 |
| WO | WO 2017002324 A1 | 1/2017 |
| WO | WO 2017/141596 | 8/2017 |

OTHER PUBLICATIONS

Written Opinion issued in corresponding PCT Application PCT/EP2019/063987.
Office Action issued in corresponding German application No. DE 10 2018 208 480.7.
Office Action dated Nov. 9, 2021 issued in Chinese Patent Application No. 201980033007.4.

* cited by examiner

A-A

US 11,305,643 B2

FUEL DELIVERY UNIT, FUEL DELIVERY SYSTEM AND VEHICLE

CROSS REFERENCE TO RELATED APPLICATIONS

This is a U.S. national stage of International application No. PCT/EP2019/063987, filed on May 29, 2019, which claims priority to German Application No. 10 2018 208 480.7, filed May 29, 2018, the content of each of which is incorporated herein by reference.

BACKGROUND OF THE INVENTION

1. Field of the Invention

The present invention relates to a fuel delivery unit for use within a fuel tank of a vehicle, to a fuel delivery system having such a fuel delivery unit, and to a vehicle having such a fuel delivery system.

2. Description of the Prior Art

As is known, such a fuel delivery unit comprises a surge tank, which is arranged on a wall of a fuel tank and from which a liquid fuel is delivered to an internal combustion engine by a fuel pump, and a flange, which closes an opening of the fuel tank and which is resiliently preloaded relative to the surge tank by at least one supporting element. This at least one supporting element, which is joined to the surge tank and the flange, simultaneously forms an anchorage between the surge tank and the flange.

During a vehicle impact, the fuel tank may be deformed as far as the fuel delivery unit such that, owing to kinetic energy introduced into the tank, the anchorage between the surge tank and the flange is detached. The result can be that a fuel feed line leading to the flange or a connector stub connected to the fuel feed line breaks at the flange. If, furthermore, a fuel line leading away from the fuel tank is not leaktight, the fuel can run out into a surrounding area in one position of a vehicle, e.g., after a vehicle rollover.

SUMMARY OF THE INVENTION

It is an object of the present invention to provide an improved fuel delivery unit of the above-described type.

In accordance with an aspect of the invention, a fuel delivery unit for use within a fuel tank of a vehicle is proposed. The fuel delivery unit has:
  a surge tank for arranging on a wall of the fuel tank, wherein a fuel pump for delivering a liquid fuel from the surge tank is arranged in the surge tank,
  a flange for arranging in an opening of the fuel tank,
  at least one support, which is arranged between the surge tank and the flange,
  a flexible fuel line, which acts as a feed line and extends from a region of the surge tank to a connector stub on the flange,
  a wiring harness, which extends from the fuel pump to the flange,
  at least one flange-side holder, which forms a first force application point for fixing the wiring harness on the flange side, and
  at least one surge tank-side holder, which is on the surge tank side and forms a second force application point for fixing the wiring harness on the surge tank side.

In conjunction with the wiring harness, the flange-side and the surge tank-side holders form a force absorbing device for protecting the feed line and the connector stub during a vehicle impact. Here, the wiring harness length between these holders is shorter than the length of the feed line, with the result that, during the vehicle impact, as a result of which the surge tank and the flange move away from one another, the wiring harness length between the holder can be subjected to a tensile load to absorb kinetic energy acting on the fuel delivery unit and thereby to dissipate it without the feed line or fuel feed line or the connector stub which is connected to it breaking off at the flange.

Here, flange-side and surge tank-side fixing of the wiring harness should be understood to mean either a clamping action of the respective holder, by which a movement of the wiring harness relative to the respectively assigned force application point is prevented, or an action by which a movement of the wiring harness relative to the respectively assigned force application point is made more difficult.

By virtue of the force absorbing device, the feed line is kept free from force or virtually free from force, or it is at least ensured that, even after a separation of at least one of the holders, the feed line can be subjected to a tensile load without it or the connector stub connected thereto being broken off at the flange because the kinetic energy is dissipated to such an extent that the remaining kinetic energy is no longer sufficient to do this.

By the force absorbing device proposed, the kinetic energy that arises during the vehicle impact and acts on the fuel delivery unit can be absorbed and thereby dissipated up to a certain limit. Here, this limit is dependent on a configuration of the holder and of the wiring harness. For the sake of safety, it is proposed to make the connector stub on the flange as short as possible in order to reduce a resulting tensile load on the connector stub.

According to one embodiment, the flange-side and/or the surge tank-side holders are/is in this case situated between the electric terminals of the wiring harness.

In this case, the surge tank-side holder is attached in a fixed manner on the surge tank side to the surge tank and/or in a region of the surge tank in the form of at least one loose connector between the wiring harness and at least one further fuel line. Here, the loose connector is attached between the wiring harness and a first and second fuel line, for example, wherein the first fuel line connects the fuel pump to a fine fuel filter and wherein the second fuel line connects the fuel pump to an ejector pump. A flange-side holder can be attached in a fixed manner to the flange on the flange side too.

According to one embodiment, the holder attached in a fixed manner to the surge tank, and/or the holder attached in a fixed manner to the flange can be in the form of a bracket, in particular a plastic bracket, molded on or inserted with a clamping action. In this case, the bracket can have an open or closed profile.

As an alternative, it would also be possible for a loose connector in the form, for example, of a cable tie, a connecting clamp etc., made of plastic or metal to function as a holder attached in a fixed manner to the surge tank and/or to the flange, if a corresponding fastening possibility is provided on the surge tank and/or on the flange, e.g., in the form of an open or closed profile or, alternatively, in the form of apertures through which such a loose connector, e.g., a cable tie, a connecting clamp made of plastic or metal and the like can be passed for the purpose of fastening.

According to another embodiment, the holder attached in a fixed manner to the surge tank can be provided on a wall of the surge tank or in a region of the surge tank, e.g., on a pump holder.

According to another embodiment, at least two holders, each forming a force application point, can be provided on the flange side and/or the surge tank side to allow force absorption or energy absorption in stages.

Also proposed is a fuel delivery system having a fuel delivery unit of the type described above.

Also proposed is a vehicle having such a fuel delivery system, wherein the vehicle can be configured as a pure internal combustion vehicle or as a partially electric vehicle having an internal combustion engine which can be operated at least temporarily with a liquid fuel.

A vehicle is to be understood here as meaning any type of vehicle which has to be supplied with a liquid fuel for operation, but in particular passenger motor vehicles and/or utility vehicles.

BRIEF DESCRIPTION OF THE DRAWINGS

The invention will be explained in detail in the following text with reference to the illustrations in the figures. Further advantageous refinements of the invention will emerge from the dependent claims and the following detailed description of proposed embodiments. In the drawings:

FIG. 5B shows a plan view of the flange shown in FIG. 5a;

DETAILED DESCRIPTION OF THE PRESENTLY PREFERRED EMBODIMENTS

Identical features or features having an identical effect are denoted by the same reference designations throughout the figures.

Figure 1:
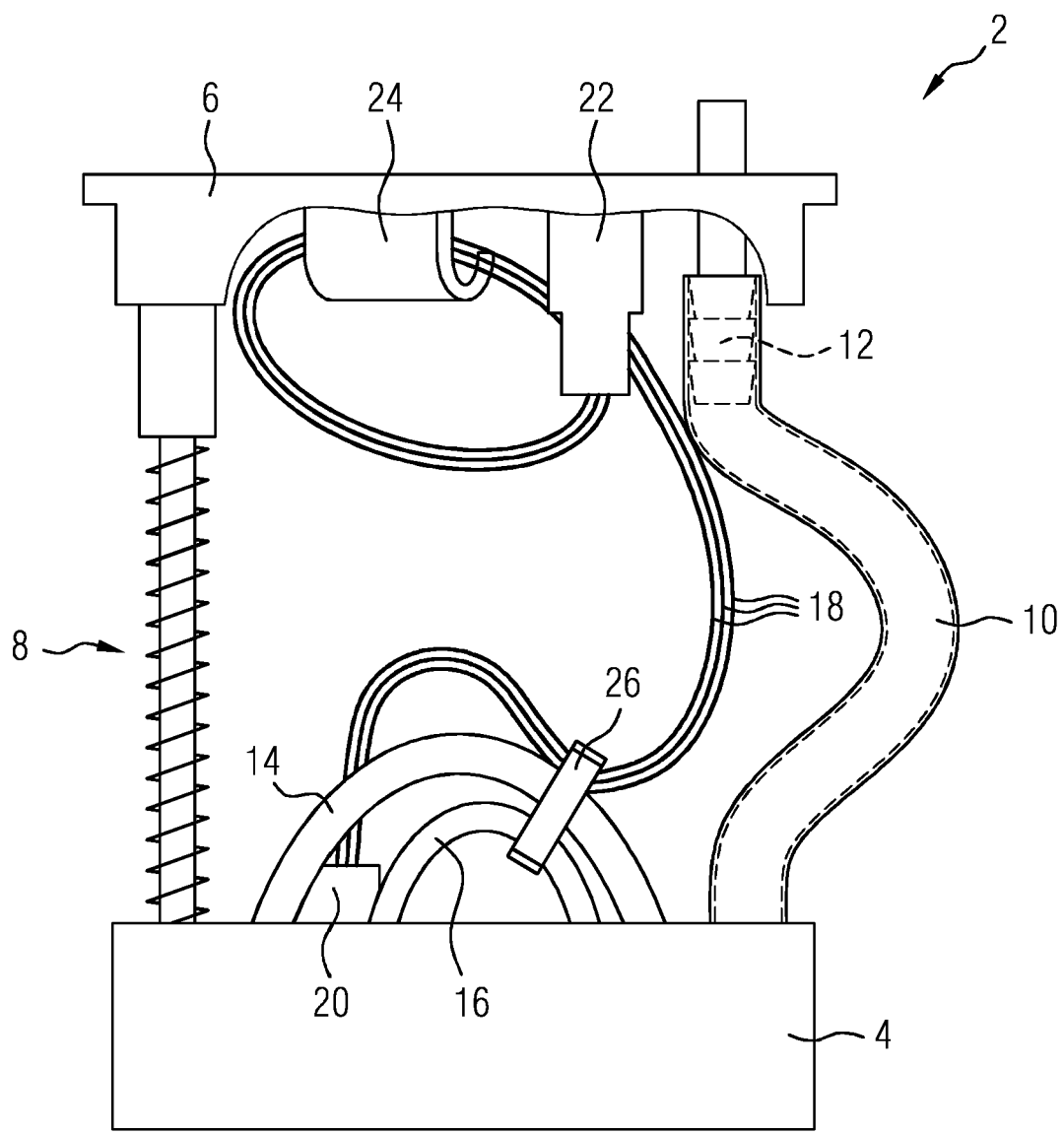
FIG. 1 shows a schematic illustration of a proposed first embodiment of a fuel delivery unit.

The fuel delivery unit 2 shown in FIG. 1 comprises a surge tank 4—belonging to a first subassembly—and a flange 6—belonging to a second subassembly—which is resiliently preloaded relative to the surge tank 4 by means of, for example, two supports 8, although only one of the two supports 8 is illustrated. While both the surge tank 4 and the flange 6 are expediently molded from a plastic for reasons of cost and weight, the respective supports 8 can comprise a metal rod or plastic rod which is surrounded by a spring, is joined as such to the surge tank 4 and the flange 6 and simultaneously forms an anchorage between the surge tank 4 and the flange 6. Instead of the metal rod or plastic rod, it is also possible to provide a metal tube or plastic tube.

Arranged in the surge tank 4 is a fuel pump which delivers a liquid fuel from the surge tank 4, via a pressure regulator and/or a fine fuel filter, which are/is arranged after the fuel pump in the flow direction of the fuel, into a flexible feed line 10 and via which the fuel flows onward to an internal combustion engine. In this arrangement, the feed line 10 extends from a region of the surge tank 4, from a connector stub formed integrally on the pressure regulator or fine fuel filter to a connector stub 12 formed integrally on the flange 6. A wiring harness 18 furthermore extends from a region of the surge tank 4 to the flange 6, wherein the wiring harness 18 connects the fuel pump to flange-side electric contacts. In this arrangement, the wiring harness 18 is plugged in, on the one hand, by a pump plug 20 on the fuel pump and, on the other hand, by a flange plug 22 on the flange 6. However, the use of such plugs is not essential to the invention. On the contrary, these electric connections can also be implemented in a different way, thus, for example, by means of "screw terminals" and the like. Depending on the type of pump, the wiring harness 18 comprises two or three power supply lines (U, V, W) and optionally a ground line or earth line (not illustrated here) for supplying a two-phase or three-phase electronically commutated DC motor or AC motor.

According to FIG. 1, a plastic bracket 24, which is hook-shaped for example, is provided on the flange 6 to fix the wiring harness 18 on the flange side. Here, the plastic bracket 24 can be plugged with a clamping action into the flange 6 or can be formed integrally on the flange 6 by appropriate overmolding. In this case, the plastic bracket can in principle have an open or closed profile. In the case of the closed profile, it should merely be ensured here that the pump plug 20—if such a pump plug is used—can be passed through the profile. Here, the plastic bracket 24 should be made so narrow, at least in some section or sections, that the wiring harness 18 can be fixed with a clamping action (see FIGS. 3A and 3B, FIGS. 4A and 4B and FIGS. 5A, 5B, 5C and 5D) in a corresponding receptacle A (cf., FIG. 5D). From this receptacle A, the wiring harness 18 is routed downward to the fuel pump.

On the surge tank side, in contrast, the wiring harness 18 is fixed relative to a flexible fuel line 14 and a flexible fuel line 16 by a loose connector, e.g., in the form of a cable tie 26—made of plastic or metal. In this case, fuel line 14 connects the fuel pump to the pressure regulator or fine fuel filter, whereas fuel line 16 connects the fuel pump to an ejector pump, which is arranged after the fuel pump in the flow direction of the fuel. At the least, however, the wiring harness 18 is fixed relative to one of these two fuel lines 14, 16.

Such a cable tie represents a universally usable and inexpensive connector. As an alternative to the cable tie, it is also possible to provide other loose connectors that are suitable for such fixing of the wiring harness 18 on the surge tank side, e.g., a plastic clamp or metal clamp and the like.

In principle, it is also possible to use a loose connector of the type described above for fixing the wiring harness 18 on the flange side if a corresponding fastening possibility is provided on the flange 6, e.g., in the form of an open or closed profile or, alternatively, in the form of apertures in the flange 6 through which such a loose connector, e.g., a cable tie, a connecting clamp made of plastic or metal and the like can be passed for the purpose of fastening.

Figure 2:
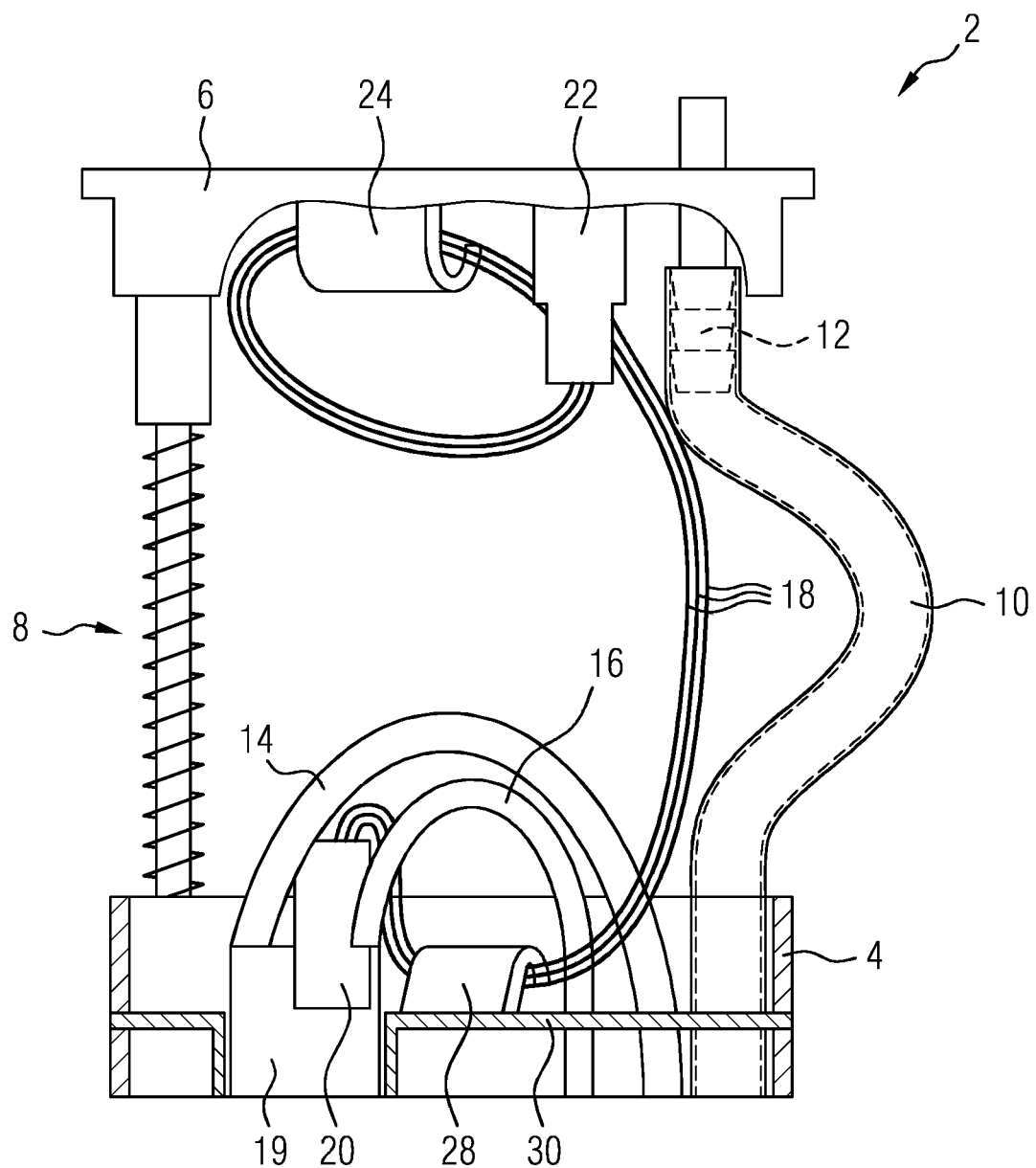
FIG. 2 shows a schematic illustration of a proposed second embodiment of a fuel delivery unit.
Figure 3A:
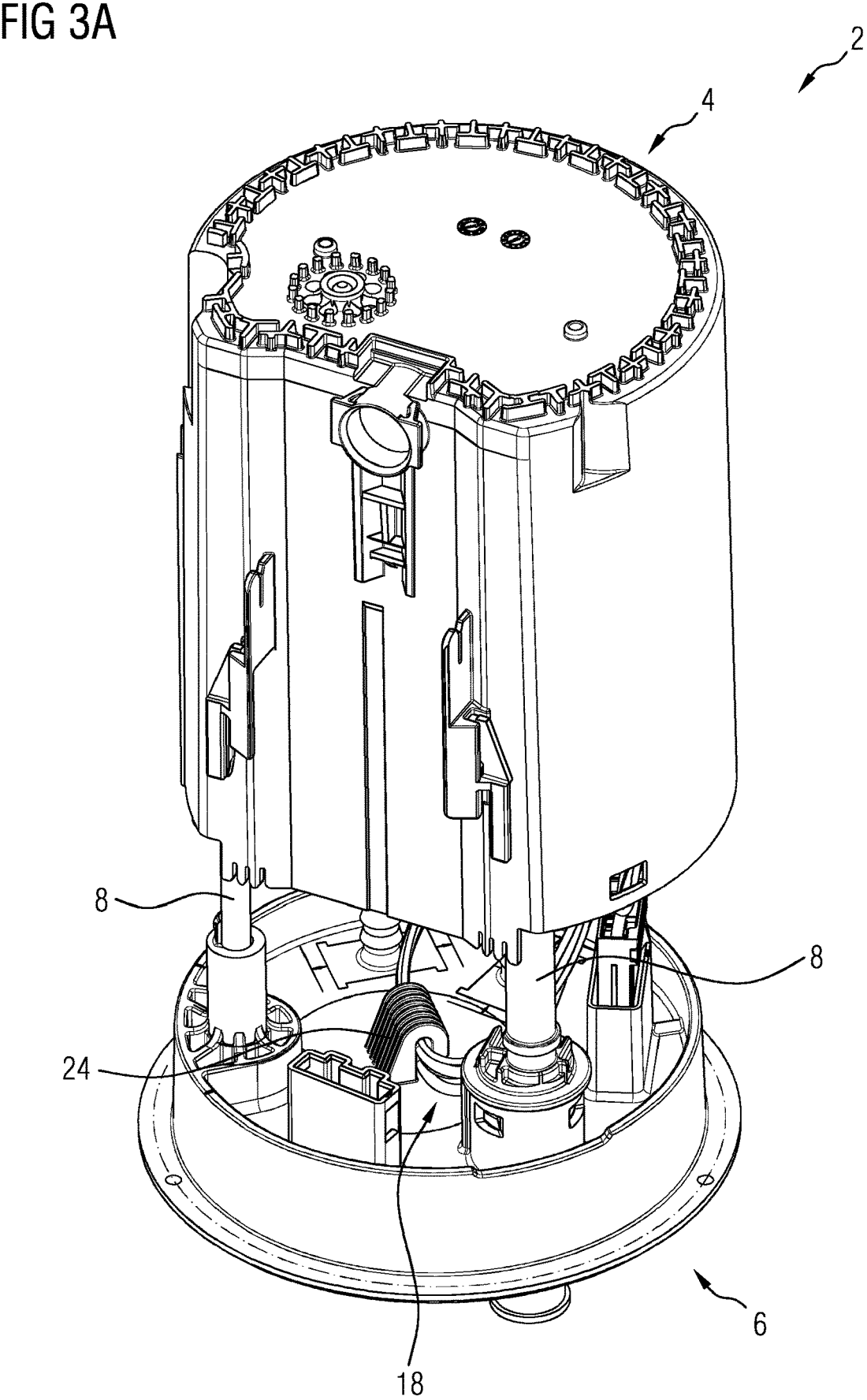
FIG. 3A shows a first perspective view of a proposed fuel delivery unit.
Figure 3B:
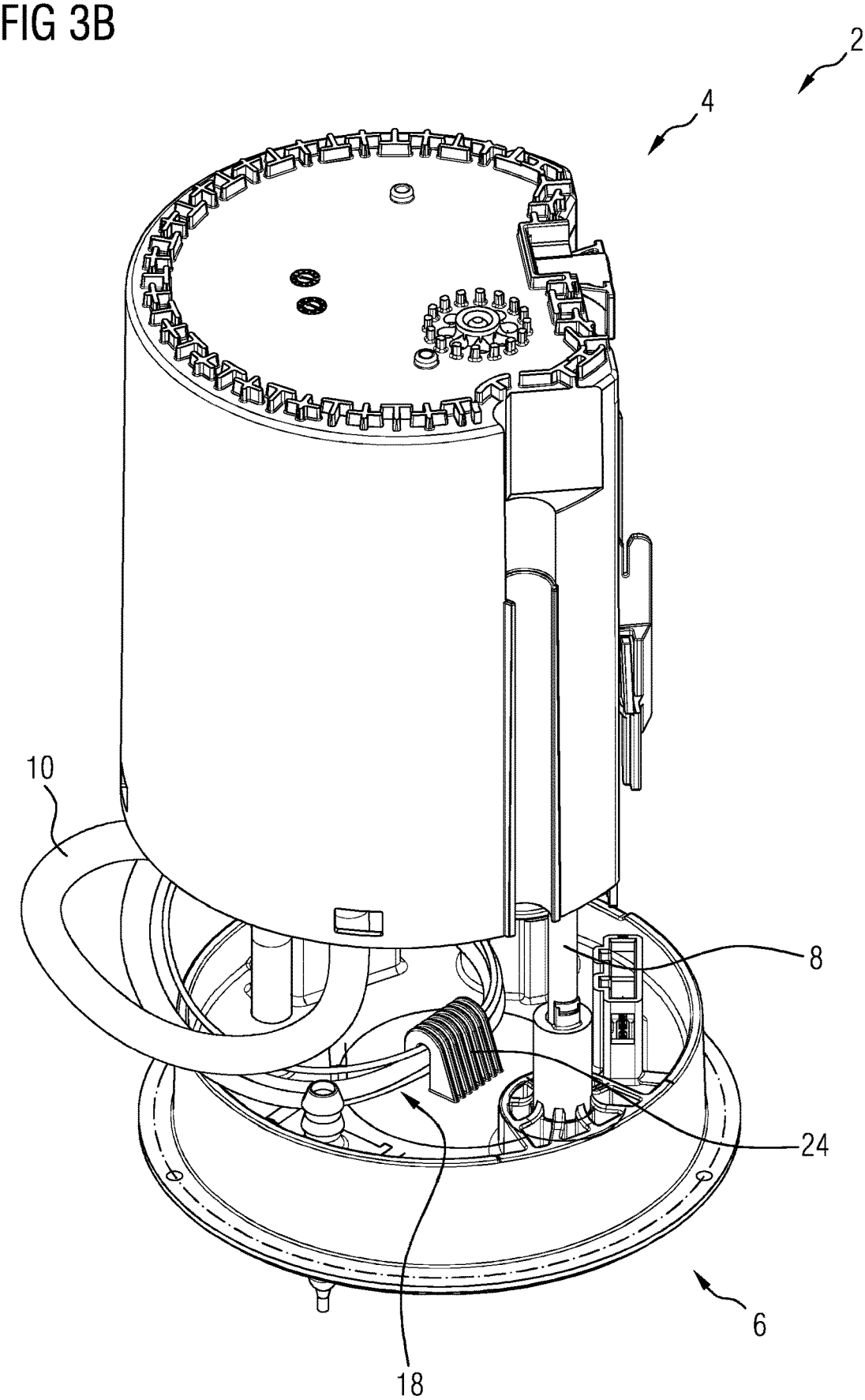
FIG. 3B shows, in a second perspective view, the fuel delivery unit shown in FIG. 3A.
Figure 4A:
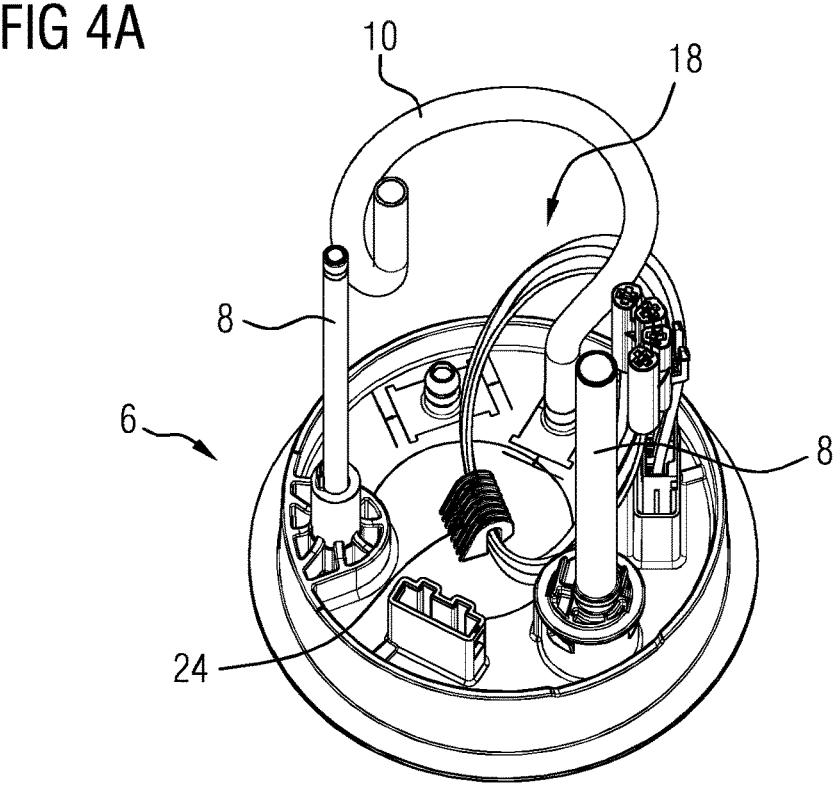
FIG. 4A shows a first perspective view of a subassembly comprising the flange of the fuel delivery unit shown in (FIG. 3A and FIG. 3B)
Figure 4B:
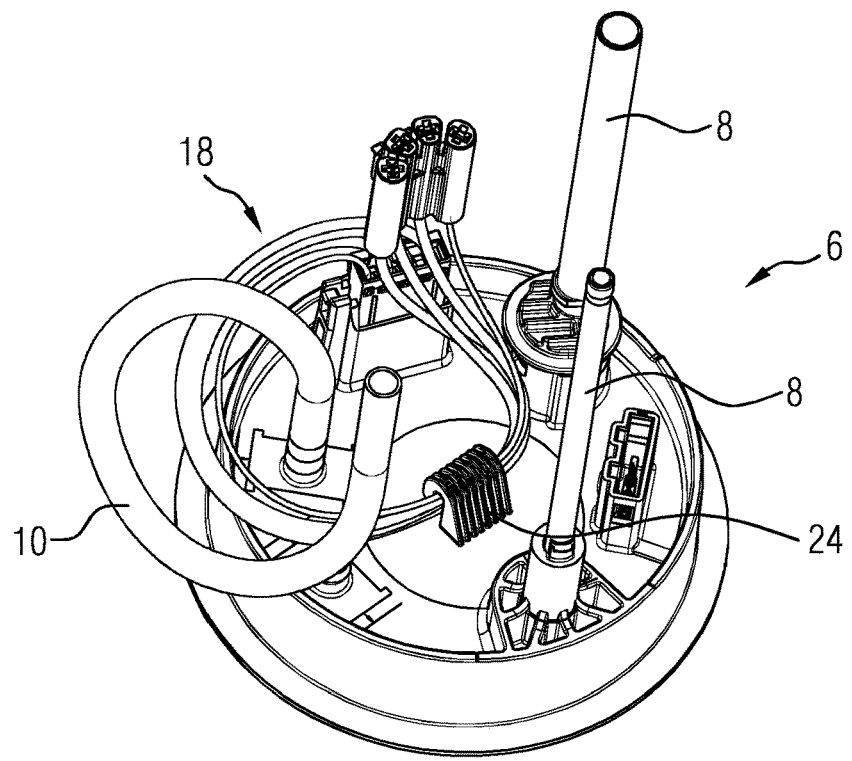
FIG. 4B shows, in a second perspective view, the subassembly shown in FIG. 4A.

In contrast to FIG. 1, the fuel delivery unit 2 shown in FIG. 2 provides a plastic bracket 28, which is hook-shaped for example, on a pump holder 30 accommodating the fuel pump 19 within the surge tank 4. In this case, the pump holder 30 can be joined to the surge tank 4 or can be molded in one piece with the surge tank 4. Here too, such a plastic bracket can in principle have an open or closed profile as long as it is ensured, in the case of the closed profile only, that the pump plug 20—if such a pump plug is used—can be passed through the profile. Here, the plastic bracket 28 can be plugged with a clamping action into the pump holder 30 or can be formed integrally on the pump holder 30 by appropriate overmolding.

Instead of the hook-shaped plastic bracket on the pump holder (as in FIG. 2), it is also possible to provide just a loose connecting element of the type described above (similarly to FIG. 1) if a corresponding fastening possibility is provided on the pump holder, e.g., in the form of an open or closed profile or, alternatively, in the form of apertures through which such a loose connector, e.g., a cable tie made of plastic or metal and the like, can be passed for the purpose of fastening. In this case, the pump holder 30 should be understood as being only illustrative of a possible location for fixing in the region of the surge tank 4. The wiring harness 18 could equally well also be fixed directly on the wall of the surge tank 4.

According to another embodiment—not illustrated by the figures—the wiring harness can be fixed with a clamping action on the surge tank side, on the one hand—similarly to FIG. 1—by a loose connector relative to at least one of the two flexible fuel lines 14, 16 but preferably relative to both fuel lines 14, 16 and, on the other hand, also directly or indirectly on the surge tank 4 or on the pump holder, similarly to FIG. 2. It is thereby possible to absorb and dissipate in stages, on the surge tank side, any kinetic energy arising from a vehicle impact and acting on the fuel delivery unit.

It should be explicitly clarified at this point that the force application points described above, or holders forming the force application points, should be understood to mean those which are situated between the electric terminals of the wiring harness and thus form separate force application points or holders. At the least, however, such a separate force application point or such a separate holders is situated between the electric terminals of the wiring harness.

According to another embodiment, the electric terminals of the wiring harness can be already be designed in such a way that they act in the manner of the above-described force application points or holders.

Figure 5A:
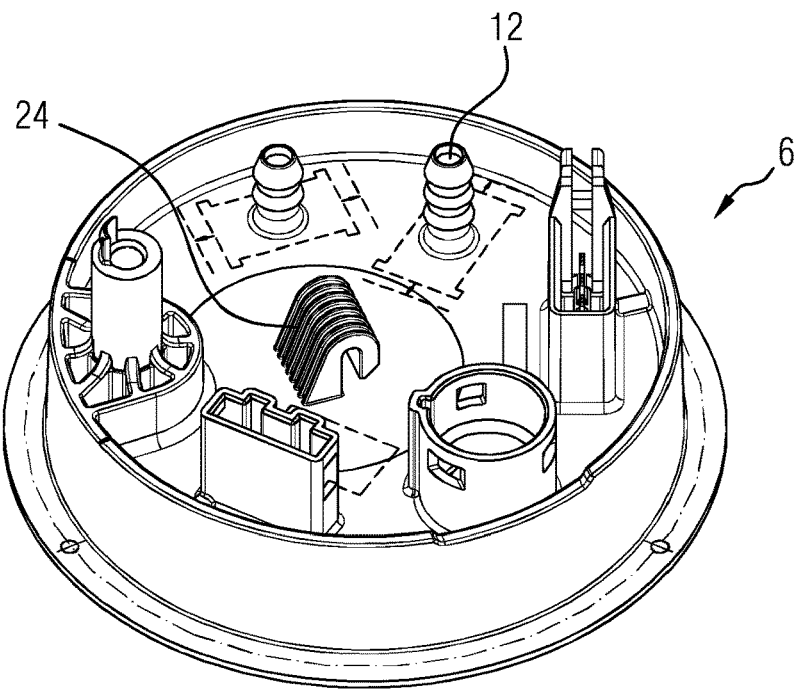
FIG. 5A shows a perspective view of the flange of the subassembly shown in (FIG. 4A and FIG. 4B)
Figure 5B:
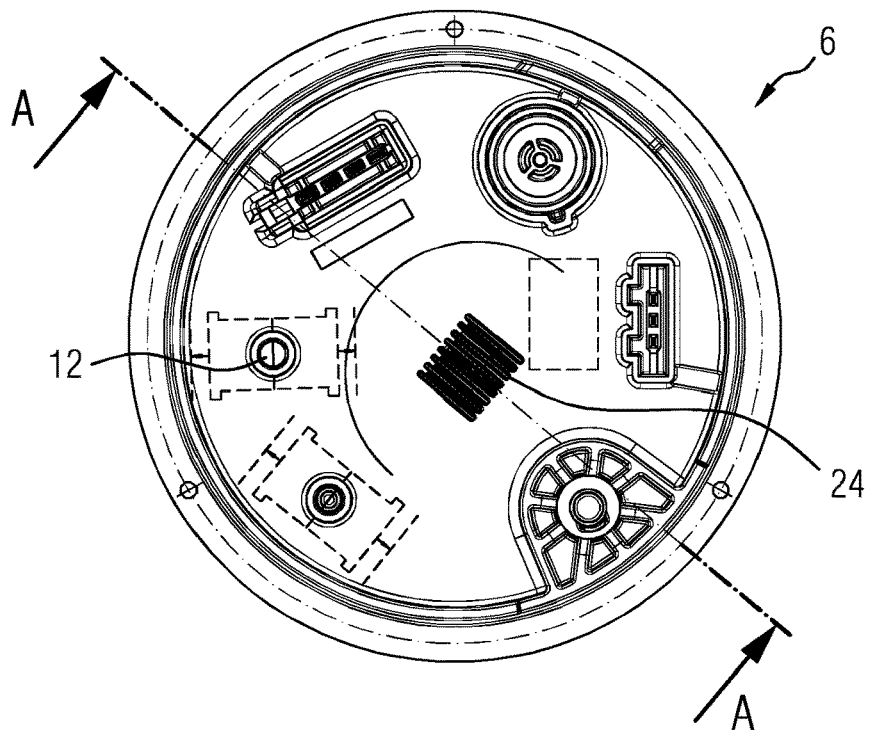
Figure 5C:
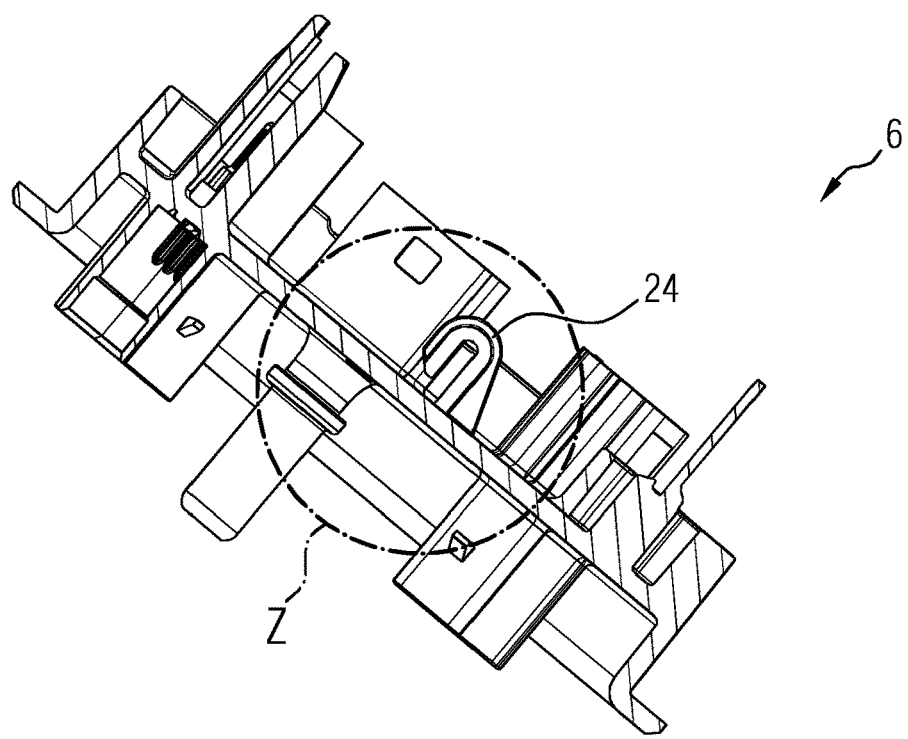
FIG. 5C shows a section along section line A-A through the flange shown in FIG. 5B.
Figure 5D:
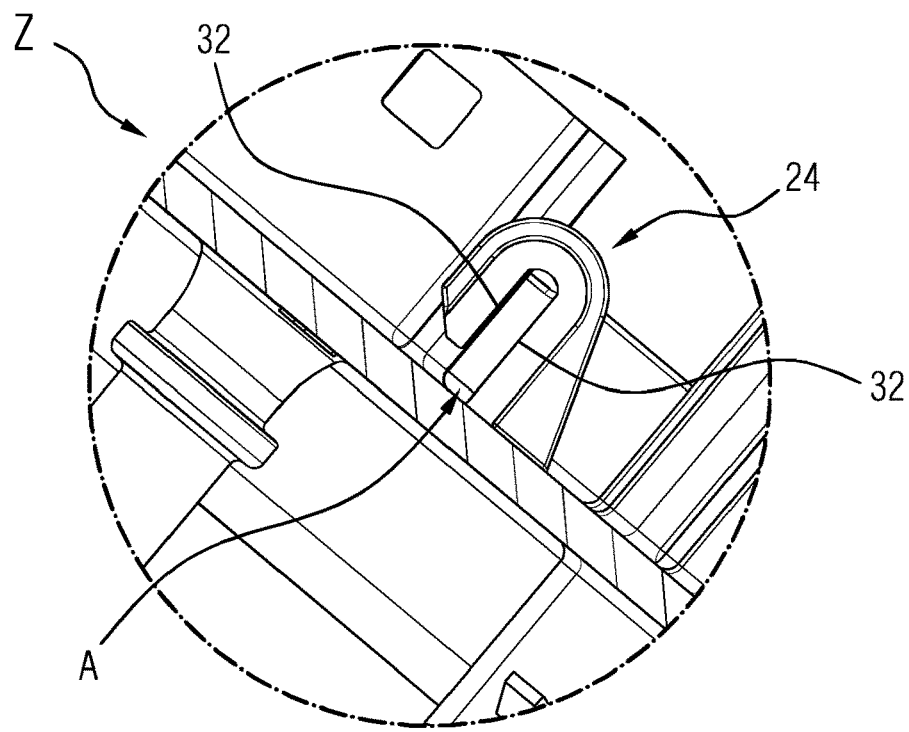
FIG. 5D shows an enlarged illustration of the region Z indicated in FIG. 5C.

FIGS. 3A, 3B, FIGS. 4A, 4B), and FIGS. 5A to D illustrate an illustrative embodiment of a hook-shaped plastic bracket 24, which is arranged on the flange 6 and forms such a narrow receptacle A (see FIG. 5D) for the wiring harness 18 that the wiring harness 18 can be correspondingly fixed with a clamping action. Here, FIG. 5C and FIG. 5D illustrate a section through the flange 6 and the plastic bracket 24 along section line A-A, wherein the section passes approximately centrally through the plastic bracket 24. It is possible to see here two projecting and mutually opposite clamping ribs 32 of the receptacle A, which effect the clamped fixing of the wiring harness 18 (see FIG. 5D).

Underlying all the above-described embodiments here is the following force absorption effect:
the flange-side and the surge tank-side holders 24, 26, 28, in conjunction with the wiring harness 18, form a kind of force absorbing device for protecting the feed line 10 and the connector stub 12 during a vehicle impact in which a fuel tank is deformed so severely as far as the fuel delivery unit 2 accommodated therein, owing to kinetic energy introduced into it, that the anchorage between the surge tank 4 and the flange 6 is detached. During this process, the surge tank 4 and the flange 6 move away from one another.

Here, the holders 24, 26, 28 exerting a fixing action define a wiring harness length extending between them which is shorter than the length of the feed line 10, with the result that, in the scenario described above, during which the surge tank 4 and the flange 6 move away from one another, the wiring harness length between the holders 24, 26, 28 can be subjected to a tensile load in order to absorb kinetic energy acting on the fuel delivery unit 2 and thereby to dissipate it without the feed line 10 or the connector stub 12 which is connected to it breaking off at the flange 6.

On the contrary, the feed line 10 remains free from force during this process, or it is at least ensured that, even after a separation of at least one of the holders 24, 26, 28, the feed line can be subjected to a tensile load without it or the connector stub 12 connected thereto being broken off at the flange 6 because the kinetic energy is dissipated to such an extent that the remaining kinetic energy is no longer sufficient to do this.

Thus, kinetic energy which arises during a vehicle impact and acts on the fuel delivery unit can be absorbed and dissipated up to a certain limit, wherein this limit is dependent on a tensile strength of the holders and of the wiring harness.

Although exemplary embodiments have been explained in the above description, it should be noted that numerous modifications are possible. Furthermore, it should be noted that the exemplary embodiments are merely examples which are not intended to limit the scope of protection, the applications and the structure in any way. Instead, the above description gives a person skilled in the art a guideline for the implementation of at least one exemplary embodiment, wherein various changes may be made, especially with regard to the function and arrangement of the component parts described, without departing from the scope of protection as apparent from the claims and combinations of features equivalent thereto.

The invention claimed is:

1. A fuel delivery unit (2) for use within a fuel tank of a vehicle, having:
    a surge tank (4) arranged on a wall of the fuel tank, wherein a fuel pump for delivering a liquid fuel from the surge tank (4) is arranged in the surge tank (4),
    a flange (6) arranged in an opening of the fuel tank,
    at least one support (8), arranged between the surge tank (4) and the flange (6),
    a flexible fuel line, configured as a feed line (10) and extending from a region of the surge tank (4) to a connector stub (12) on the flange (6),
    a wiring harness (18), which extends from the fuel pump to the flange (6),
    at least one flange-side holder (24), configured to form a first force application point for fixing the wiring harness (18) on the flange side, and
    at least one surge tank-side holder (26, 28), which is on the surge tank side and is configured to form a second force application point for fixing the wiring harness (18) on the surge tank side,
    wherein, the wiring harness (18), the at least one flange-side holder and the at least one surge tank-side holder (24, 26, 28) together form a force absorber configured to protect the feed line (10) and the connector stub (12) during a vehicle impact, wherein the wiring harness length between the at least one flange-side holder (24) and the at least one surge tank-side holder (26, 28) is shorter than the length of the feed line (10), such that, during the vehicle impact, as a result of which the surge tank (4) and the flange (6) move away from one another, the wiring harness length between the at least one flange-side holder (24) and the at least one surge tank-side holder (26, 28) is subjected to a tensile load so as to absorb kinetic energy acting on the fuel delivery unit (2) and thereby dissipate the kinetic energy, without the feed line (10), or the connector stub (12) to which it is connected, breaking off at the flange (6).

2. The fuel delivery unit (2) as claimed in claim 1, wherein the at least one flange-side holder (24) and/or the at least one surge tank-side holder (26, 28) are/is situated between the electric terminals of the wiring harness (18).

3. The fuel delivery unit (2) as claimed in claim 1, wherein a connector (26) is attached in a fixed manner on the surge tank side to the surge tank (4) and/or in a region of the surge tank in the form of at least one loose connector between the wiring harness (18) and at least one further fuel line (14, 16).

4. The fuel delivery unit (2) as claimed in claim 3, wherein the loose connector is attached between the wiring harness (18) and a first and second fuel line (14, 16), wherein the first fuel line (14) connects the fuel pump to a pressure regulator or to a fine fuel filter and wherein the second fuel line (16) connects the fuel pump to an ejector pump.

5. The fuel delivery unit (2) as claimed in claim 3, wherein the loose connector is a cable tie.

6. The fuel delivery unit (2) as claimed in claim 1, wherein the at least one flange-side holder (24) is attached in a fixed manner to the flange (6) on the flange side.

7. The fuel delivery unit (2) as claimed in claim 6, wherein the at least one surge tank-side holder (28), and/or the at least one flange-side holder (24) are/is configured as a plastic bracket molded on, or inserted with a clamping action.

8. The fuel delivery unit (2) as claimed in claim 7, wherein the surge tank-side plastic bracket is provided on a wall of the surge tank (4) or in a region of the surge tank (4) on a pump holder.

9. The fuel delivery unit (2) as claimed in claim 1, wherein at least two holders (26, 28), each forming a force application point, are provided on the flange side and/or the surge tank side for force absorption in stages.

10. A fuel delivery system having a fuel delivery unit (2) as claimed in claim 1.

11. A vehicle having a fuel delivery system as claimed in claim 10.

12. The vehicle as claimed in claim 11, wherein the vehicle is configured as a pure internal combustion vehicle or as a partially electric vehicle operable at least temporarily with a liquid fuel.

* * * * *